(12) United States Patent
Fuse et al.

(10) Patent No.: US 8,980,390 B2
(45) Date of Patent: Mar. 17, 2015

(54) SYNTHETIC RESIN BOTTLE AND PROCESS FOR MANUFACTURING THE SAME

(75) Inventors: Yoshihiro Fuse, Isehara (JP); Yuich Okuyama, Isehara (JP); Masahiro Sugai, Isehara (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 17 days.

(21) Appl. No.: 13/388,190

(22) PCT Filed: Aug. 19, 2010

(86) PCT No.: PCT/JP2010/063972
§ 371 (c)(1),
(2), (4) Date: Apr. 4, 2012

(87) PCT Pub. No.: WO2011/024694
PCT Pub. Date: Mar. 3, 2011

(65) Prior Publication Data
US 2012/0187068 A1 Jul. 26, 2012

(30) Foreign Application Priority Data

Aug. 31, 2009 (JP) .................. 2009-200443

(51) Int. Cl.
*B32B 1/02* (2006.01)
*B29C 49/00* (2006.01)
(Continued)

(52) U.S. Cl.
CPC ............... *B29C 49/00* (2013.01); *B65D 1/0207* (2013.01); *B29C 49/0005* (2013.01); *B29C 49/06* (2013.01);
(Continued)

(58) Field of Classification Search
CPC .......... B32B 1/02; B65D 1/02; B65D 1/0207; B65D 1/023; B29C 49/0005; B29C 49/08
USPC ........... 428/34.1, 34.4, 34.6, 34.7, 35.7, 36.4, 428/36.6, 36.7, 36.9, 36.91, 542.8; 264/532
See application file for complete search history.

(56) References Cited

U.S. PATENT DOCUMENTS

| 4,618,515 A | 10/1986 | Collette et al. |
| 4,907,709 A * | 3/1990 | Abe et al. ..................... 215/252 |

(Continued)

FOREIGN PATENT DOCUMENTS

| JP | B2-61-24170 | 6/1986 |
| JP | A-10-058527 | 3/1998 |

OTHER PUBLICATIONS

Translation of Written Opinion issued in International Application No. PCT/JP2010/063972 dated Nov. 16, 2010.
(Continued)

*Primary Examiner* — Walter B Aughenbaugh
(74) *Attorney, Agent, or Firm* — Oliff PLC

(57) ABSTRACT

A biaxially stretched, blow molded bottle made of a resin comprising at least one of polyethylene terephthalate and a copolymerized polyester comprising ethylene terephthalate. The bottle neck is formed, just as the bottle body is formed, by expanding a body of a preform in a shape of a test tube in a stretching step of the molding process. The bottle neck has an average thickness in a range of 0.6 to 1.8 mm, and at the bottle neck, the resin is partially crystallized and is in an oriented crystallized state. A ratio of an absolute value of crystallization enthalpy, $\Delta Hc$, to melting enthalpy, $\Delta Hm$ ($|\Delta Hc|/\Delta Hm$) of the bottle neck is a value less than 0.1, and a rate of dimensional change in the outer diameter of the bottle neck is 0.2% or less.

9 Claims, 4 Drawing Sheets

(51) Int. Cl.
  *B65D 1/02* (2006.01)
  *B29C 49/06* (2006.01)
  *B29C 49/08* (2006.01)
  *B29C 49/12* (2006.01)
  *B29K 67/00* (2006.01)
  *B29L 31/00* (2006.01)

(52) U.S. Cl.
  CPC .................. *B29C 49/08* (2013.01); *B29C 49/12* (2013.01); *B29C 2793/009* (2013.01); *B29K 2067/00* (2013.01); *B29K 2995/0041* (2013.01); *B29K 2995/0063* (2013.01); *B29L 2031/716* (2013.01); *B65D 1/023* (2013.01)
  USPC ........................ 428/35.7; 428/36.9; 428/542.8

(56) References Cited

U.S. PATENT DOCUMENTS

| | | | |
|---|---|---|---|
| 6,555,191 | B1 | 4/2003 | Smith et al. |
| 7,531,125 | B2 | 5/2009 | Dygert et al. |
| 2007/0289933 | A1 | 12/2007 | Weissmann et al. |
| 2009/0197150 | A1* | 8/2009 | Tanaka et al. .................. 429/38 |

OTHER PUBLICATIONS

International Search Report issued in International Application No. PCT/JP2010/063972 dated Nov. 16, 2010 (with translation).

* cited by examiner

Fig.3

Table 1

| Mold temperature (°C) | Density (g/cm³) | $|\Delta Hc|$ (J/g) | $\Delta Hm$ (J/g) | $|\Delta Hc|/\Delta Hm$ | Dimensional Change (%) |
|---|---|---|---|---|---|
| 110 | 1.359 | 9.6 | 43.1 | 0.22 | −0.47 |
| 118.5 | 1.365 | 4.1 | 39.4 | 0.10 | −0.25 |
| 135 | 1.368 | 0 | 39.7 | 0 | −0.18 |
| 149 | 1.373 | 0 | 40.1 | 0 | −0.10 |
| 167 | 1.383 | − | − | − | −0.01 |

SYNTHETIC RESIN BOTTLE AND PROCESS FOR MANUFACTURING THE SAME

TECHNICAL FIELD

This invention relates to a wide-mouthed, synthetic resin bottle made of a resin of polyethylene terephthalate series and formed by a biaxial stretching and blow molding process, and to a process for manufacturing the same.

BACKGROUND ART

Patent Document 1 discloses a biaxially stretched, blow molded bottle made of a polyethylene terephthalate (PET) resin (hereinafter sometimes referred to as the PET bottle), which is used for such products as teas, juices, and the like, that require hot filling or heat treatment processes, such as sterilization.

Thus, in the case of those PET bottle used for hot filling with teas, juices, etc., or for the heat treatment of some products, at a temperature in the range of about 80 to 90° C., use is made of a so-called heat-resisting neck which has been treated to give improved resistance to heat deformation. As the known thermal crystallization treatment processes, there are a process utilizing a hot-blast nozzle, such as described in Patent Document 2, and a process utilizing an infrared heater.

PRIOR ART REFERENCES

Patent Documents

Patent Document 1: Japanese patent application No. 1998-058527A
Patent Document 2; Japanese patent publication No. 1986-24170B

SUMMARY OF THE INVENTION

Technical Problems to be Solved by the Invention

In the manufacture of a biaxially stretched, blow molded bottle, the neck of the preform is directly used as the neck of the bottle without stretching the preform neck. The neck needs to have a thick wall and a heat-resisting property obtained by subjecting the neck to thermal crystallization, as described above. This is because the neck as it is molded may shrink or deform during the hot filling at a high temperature, thus leaving a possibility that a basic requirement for the bottle, i.e., the seal by a cap, may be impaired.

Wide-mouthed bottles having a wide neck are manufactured depending on the purposes intended for the bottle. If these bottles have a thick neck wall, a large amount of resin is required for the neck because of a wide mouth, which raises a problem from point of views of material cost and resource saving.

If the preform neck has a large diameter, there arises a problem of low productivity because of a limitation regarding mold face of the injection molding machine. That is, the larger the diameter of the preform neck, the less in the number of the preforms moldable in one shot would be.

A technical problem of this invention is to create a bottle structure or a process for manufacturing the bottle of such a structure, for a purpose of improving heat resisting property or productivity of a biaxially stretched, blow molded, and wide-mouthed bottle made of a resin of the above-described PET series.

Means of Solving the Problem

A main feature of this invention associated with the bottle to solve the above technical problem is a biaxially stretched, blow molded bottle made of a resin of polyethylene terephthalate series, characterized in that a bottle neck is formed, just as the bottle body is formed, by expanding a body of a preform in a shape of a test tube to give the bottle neck a large diameter in a stretching step of a biaxial stretching and blow molding process, and that bottle neck density is set at 1.368 g/cm$^3$ or more by meeting a processing condition for stretching in the above-described stretching step and by setting a predetermined mold temperature within a thermally crystallizable range used for the resin of the polyethylene terephthalate series.

Like the body, the neck of the bottle having the above-described feature also undergoes oriented crystallization through the stretching process step. Microcrystals are formed by this oriented crystallization and are used as the nuclei to further promote uniform and sufficient crystallization when the neck is in contact with the mold which has been heated to a predetermined mold temperature within a thermally crystallizable range for the PET series resin. Thus, the neck density of 1.368 g/cm$^3$ is achieved. Even if the bottle neck has a relatively thin wall, full heat resistance is fulfilled during the hot filling process.

In addition, it becomes possible to solve the above-described material cost and resource saving problems caused by widening the neck to manufacture the wide-mouthed bottles. Since small-diameter preforms can be used, it is also possible to solve the problem of low productivity caused by the limitation of mold face.

The bottle neck is molded in a stretching step in a mold where the mold temperature is set at a relatively high temperature. When the stretching requirement is combined with the other requirement for a relatively high mold temperature, the biaxial stretching and blow molding operation goes hand in hand with the crystallization which proceeds uniformly. Under such a condition, the bottle neck is allowed to have a density level of 1.368 g/cm$^3$. It should be noted here that only the stretching step cannot fully increase the density because the bottle neck has a smaller draw ratio as compared with that of the body. On the other hand, even though the mold temperature is high, only the heat from the mold makes it difficult to increase the bottle neck density in a short period of time without giving damage to productivity in the biaxial stretching and blow molding operation.

The range of thermally crystallizable temperatures for the PET series resins is shown as a temperature range in which an exothermic peak appears during the crystallization that develops in the temperature range of about 80 to 180° C., as found from the data of differential scanning calorimetry (DSC) measured at temperatures rising at a constant speed.

Another feature of this invention associated with the bottle is that in the above-described main feature, the bottle neck density is set at 1.370 g/cm$^3$ or more.

According to the above feature, sufficient heat-resisting property can be imparted additionally by setting the bottle neck density at 1.370 g/cm$^3$ or more.

Still another main feature of this invention associated with the bottle is that, in the synthetic resin bottle made of a PET series resin and manufactured by the biaxial stretching and blow molding process, the bottle neck is formed, just as the body is formed, by expanding the body of a test-tube-like preform to give the bottle neck a large diameter in the stretching step of the biaxial stretching and blow molding process.

More specifically, a ratio of an absolute value of crystallization enthalpy, ΔHc, to melting enthalpy, ΔHm, (that is, |ΔHc|/ΔHm) is set at a value less than 0.1, by meeting the processing condition for stretching in this stretching step and by setting a predetermined mold temperature within a thermally crystallizable range used for the resin of the polyethylene terephthalate series.

The crystallization enthalpy is calculated from the exothermic peak appearing at the time of crystallization and the melting enthalpy is calculated from an endothermic peak appearing at the time of melting, as observed by differential scanning calorimetry (DSC) wherein calorific values are measured at temperatures rising at a constant speed.

The above feature utilizes a ratio of an absolute value of crystallization enthalpy, ΔHc, to melting enthalpy, ΔHm, (that is, |ΔHc|/ΔHm) as an index to show the extent to which the crystallization makes progress in the neck. The method of measuring ΔHc and ΔHm by means of the differential scanning calorimetry (DSC) comprises the following steps:

(1) A sample taken from the neck is set in a sample pan; and
(2) The sample is heated from 20° C. to 300° C. at a constant speed (10° C./min). ΔHc is calculated from an area of the exothermic peak appearing along with the crystallization that develops in a temperature range of about 80 to 180° C. ΔHm is calculated from an area of the endothermic peak appearing along with the melting that develops in a temperature range of about 170 to 260° C.

If the effect of stretching in the stretching step and setting an elevated mold temperature allows the crystallization of the bottle neck to proceed fully, then further crystallization would hardly proceed under the measuring conditions described above. In that case, the absolute value of ΔHc comes close to zero. And the bottle would have high heat resistance during the hot fill process, by setting the ratio of (|ΔHc|/ΔHm) at a value less than 0.1.

Still another feature of this invention associated with the bottle is that the bottle neck has an average thickness in a range of 0.6 to 1.8 mm. Even if the bottle of this invention has a relatively thin neck thickness in this range, the bottle has sufficient heat resistance. Conventional ordinary PET bottle has a neck thickness of about 2 mm.

A main feature of this invention associated with the manufacturing process is a biaxially stretching and blow molding process for manufacturing a synthetic resin bottle made of a PET series resin, which process comprises the steps of:

(1) using a preform in a shape of a test tube;
(2) setting a predetermined mold temperature within a thermal crystallization range used for the resin of the polyethylene terephthalate series to heat an area of a blow mold where the bottle neck is formed;
(3) forming the bottle neck, in a manner similar to forming the body, by expanding the diameter of a preheated preform in the test tube shape in a stretching step of the biaxial stretching and blow molding process; and
(4) adjusting the levels of the draw ratio and the mold temperature in an area of preform corresponding to the bottle neck so that neck density, an index of the extent to which crystallization is in progress at the bottle neck, would have a predetermined level or higher.

According to the manufacturing process having the above-described feature, the draw ratio and the mold temperature are adjusted, using neck density as an index of the extent to which crystallization is in progress at the bottle neck. When the draw ratio is combined with a relatively high mold temperature, the preform is biaxially stretched and blow molded into the bottle, and at the same time, crystallization of the bottle neck is allowed to proceed at high productivity to impart a high heat-resisting property to the bottle, without requiring the bottle to pass through a conventional step of thermal crystallization treatment by means of an infrared heater and the like.

The combination of draw ratio with mold temperature can be arbitrarily determined, giving consideration to a combination of the bottle neck diameter with the preform neck diameter, the productivity of injection molding of the preform, the productivity of biaxial stretching and blow molding, and the like.

Another main feature of this invention associated with the manufacturing process is a biaxially stretching and blow molding process for manufacturing a synthetic resin bottle made of a PET series resin, the process comprising the steps of:

(1) using a preform in a shape of a test tube;
(2) setting a predetermined mold temperature within a thermal crystallization range used for the resin of the PET series to heat an area of the mold where the bottle neck is formed;
(3) forming the bottle neck, in a manner similar to forming the body of the bottle, by expanding the diameter of a preheated preform in the test tube shape in a stretching step of the biaxial stretching and blow molding process; and
(4) adjusting the levels of the draw ratio and the mold temperature in an area of preform corresponding to the bottle neck so that a ratio of an absolute value of crystallization enthalpy, ΔHc, to melting enthalpy, ΔHm, (that is, |ΔHc|/ΔHm), would come to less than a predetermined value, wherein the crystallization enthalpy ΔHc is calculated from an exothermic peak appearing at the time of crystallization and the melting enthalpy ΔHm is calculated from an endothermic peak appearing at the time of melting, as observed by differential scanning calorimetry (DSC) that measures the calorific values at temperatures rising at a constant speed.

The above feature uses the ratio of the absolute value of the crystallization enthalpy ΔHc to the melting enthalpy ΔHm (|ΔHc|/ΔHm) as an index of the extent to which crystallization is in progress at the bottle neck.

Still another feature of this invention associated with the manufacturing process is that the temperature of a portion of the mold in which to mold the bottle neck is set at 135° C. or higher.

The temperature to which the mold should be heated can be arbitrarily determined, taking into consideration the draw ratio to be used for the bottle neck and the productivity of the biaxial stretching and blow molding process. Even if the bottle neck has a draw ratio (vertical draw ratio×lateral draw ratio) corresponding to a bottle neck size a few times as much as the preform neck size, the bottle can endure a high temperature during the hot filling process, by setting the mold temperature at 135° C. or higher. Conventional thermal crystallization treatment for the bottle neck is carried out at a temperature of about 200° C. by using an infrared heater and the like. According to the manufacturing process of this invention, the crystallization can be carried out at a relatively low temperature of about 135° C. in a short period.

Still another feature of this invention associated with the manufacturing process is that a preform in the test tube shape is stretched to form a bottle neck and to obtain the final molded product in a biaxial stretching and blow molding process comprising the steps of:

(1) using a preform having a cylindrical body and having a preform neck with a preform neck ring disposed at an upper end of the body;
(2) fixing the preform in a mold by utilizing this preform neck;

(3) biaxially stretching the body and a bottom of the preform to form the neck, the shoulder, the body, and the bottom of the bottle; and (4) then cutting off a portion of the preform including the preform neck that has been integrally connected to the upper end of the bottle neck.

The PET resin is mainly used as the resin of the PET series in this invention. With ethylene terephthalate resin units as a major part, copolymerized polyesters containing other polyester units can also be used so long as there is no damage to the essential quality of the PET resin. For example, small amounts of nylon series resins, polyethylene naphthalate resins, and the like can be blended with the PET resin in order to improve the heat-resisting property of the bottle. As the ingredients to form copolymerizable polyesters, there are dicarboxylic ingredients, such as isophthalic acid, naphthalene-2, 6-dicarboxylic acid, and adipic acid; and glycol ingredients, such as propylene glycol, 1,4-butanediol, tetramethylene glycol, neopentyl glycol, cyclohexane dimethanol, diethylene glycol, etc.

In addition, the bottles of this invention made of a PET series resin may have a middle layer of a nylon resin in such a formation as a PET resin/a nylon resin/a PET resin, in order to improve the heat-resisting property and a gas barrier property, so long as the essential quality of the PET resin bottle is not damaged.

Effects of the Invention

This invention comprising a synthetic resin bottle having the above-described features and a process for manufacturing such a bottle has the following effects:

The synthetic resin bottle of this invention having main features is biaxially stretched to subject the bottle neck to oriented crystallization just as the body is so treated. Microcrystals are formed by this oriented crystallization and are used to further promote uniform crystallization when the resin is in contact with the mold which has been set at a high temperature. As a result, a density of 1.368 g/cm³ or more is obtained, or a ratio of the absolute value of crystallization enthalpy ΔHc to melting enthalpy ΔHm (i.e., |ΔHc|/ΔHm) can be limited to less than 0.1. Even though the bottle has a relatively thin wall thickness, the bottle having these levels of density and ratio can outstand to shrinkage or deformation, and has a high heat-resisting property.

According to the manufacturing process of this invention, the extent of stretch and the setting of a mold temperature are adjusted by using density or a ratio of the absolute value of crystallization enthalpy ΔHc to the melting enthalpy ΔHm (i.e., |ΔHc|/ΔHm) as the indexes to indicate the extent to which the crystallization is in progress. A stretching requirement combined with another requirement for a high mold temperature allows the biaxial stretching and blow molding operation to go hand in hand with the crystallization of bottle neck at high productivity, and the bottle is provided with a high heat-resisting property, without depending on a conventional thermal crystallization treatment step using an infrared heater.

BRIEF DESCRIPTION OF THE DRAWINGS

FIG. 3 is Table 1 showing relationships of the mold temperature with neck density, crystallization enthalpy, or dimensional changes in the bottle.

PREFERRED EMBODIMENTS OF THE INVENTION

Figure 1:
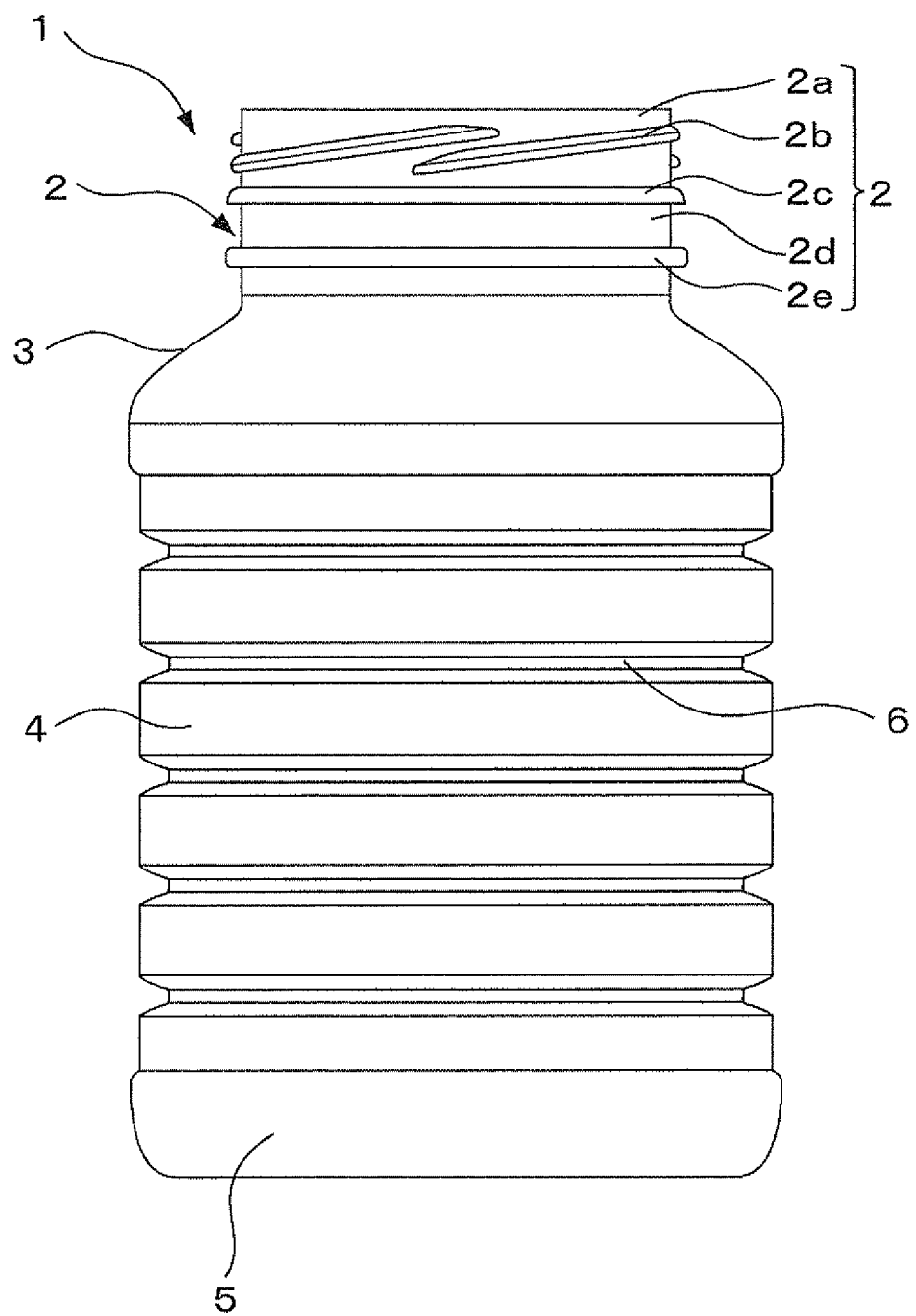
FIG. 1 is a front view of the synthetic resin bottle in one embodiment of this invention.
Figure 2:
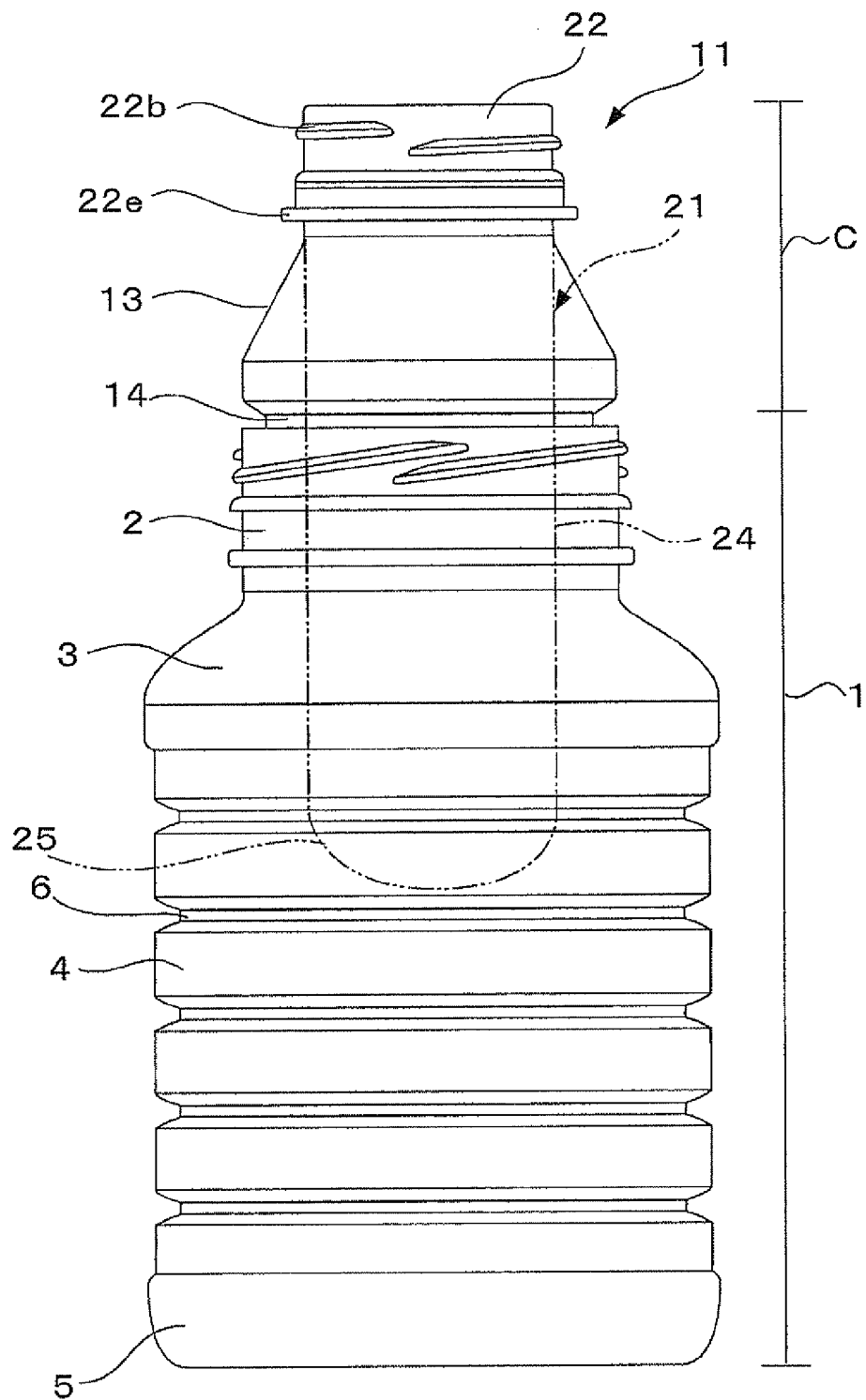
FIG. 2 is a front view of an example of the intermediate molded product of the bottle of FIG. 1.

This invention is further described with respect to preferred embodiments, now referring to the drawings, in which FIG. 1 is a front view of the synthetic resin bottle in one embodiment of this invention, and FIG. 2 is a front view of an example of the intermediate molded product that precedes the bottle of FIG. 1. The bottle 1 is formed by biaxially stretching and blow molding a PET resin preform, and comprises a neck 2, a shoulder 3, a body 4, and a bottom 5. Five peripheral groove ribs 6 are disposed in the wall of the body 4 to increase the rigidity and buckling strength of the peripheral wall.

The bottle 1 has the following main dimensions and capacity: an outer diameter of the neck of 59.61 mm, an average neck wall thickness of 1.05 mm, an outer diameter of the body of 90.5 mm, an average body wall thickness of 0.43 mm, a total height of 147.76 mm, and a capacity of 725 ml.

The process for manufacturing the above-described bottle 1, which is one embodiment of the manufacturing process of this invention, will be described below. In a summary, the manufacturing process of this invention comprises using a preform 21 of FIG. 2 with portions from the body 24 to the bottom 25 depicted in a two-dot chain line, biaxially stretching and blow molding the preform 21 into an intermediate molded product 11, and then cutting off a cutoff portion C located in an upper portion of the intermediate molded product 11 to obtain the bottle 1. The manufacturing process of this invention is characterized by two requirements in that along with the body 4, the bottle neck 2 is stretched vertically as well as laterally in the stretching step and that the temperature of a portion of the mold where the bottle neck 2 is formed is set at a relatively high temperature so that the bottle neck 2 is fully crystallized under both requirements.

The preform 21 to be used is the one generally used in the art conventionally. It has a test tube shape, and comprises a preform neck 22 having a screw thread 22b and a preform neck ring 22e respectively in upper and lower portions, a cylindrical body 24, and a bottom 25 in a semi-spherical shell shape. The main dimensions of this preform 21 are an average body wall thickness of 4.2 mm, an outer body diameter of 33 mm, and a height of 97 mm measured from under the preform neck 22.

The intermediate molded product 11 comprises the bottle 1 portion, which is the end molded product, and the cutoff portion C to be cut off after the blow molding, both of which are connected to each other integrally. Right under the preform neck 22 of the preform 21 is a stretched connection 13 in a tapered cylindrical shape, which is formed by widening the upper end of the body 24 of the preform 21 in the biaxial stretching and blow molding operation. This stretched connection 13 integrally connects the preform neck 22 of the preform 21 to the neck 2 of the bottle 1. A peripheral guide groove 14 is formed under the lower end of this stretched connection 13 to facilitate the removal of the cutoff portion C. The stretched connection 13 in the tapered cylindrical shape enables the bottle neck 2 to be stretched smoothly in an expanding manner.

The neck 2 of the bottle 1 is a portion which is stretched vertically and laterally along with the body 4 in the biaxial stretching and blow molding step. In this embodiment, the bottle neck 2 has a total draw ratio (product of vertical draw ratio and lateral draw ratio) of about 4 times. Incidentally, the body 4 has a total draw ratio of 6 times. Under the principal molding conditions of the biaxial stretching and blow molding operation set for this embodiment, the preform 11 uses a preheating temperature of 120° C. and an average mold temperature of 130° C. for the portions to be molded into the body 4 and the bottom 5.

FIG. 3, which is Table 1, shows the results of measurements for physical properties of the neck 2 of the bottle 1, such as average density, rates of dimensional changes at high temperatures, and ratios of the absolute value of crystallization enthalpy to melting enthalpy ($|\Delta Hc|/\Delta Hm$), obtained when the portion to be molded into the neck 2 of the bottle 1 was heated to mold temperatures of 110, 118.5, 135, 149, and 167° C. Each physical property was measured under the following measurement conditions:

(1) Density was measured by taking samples from a lip portion 2a, a screw threaded portion 2b, a portion under bead 2d, and a neck ring portion 2e, respectively, of the bottle neck 2 (See FIG. 1), measuring the density of these portions according to a measuring method of JIS K7112, and calculating average values at respective temperatures.

(2) The crystallization enthalpy $\Delta Hc$ and the melting enthalpy $\Delta Hm$ were obtained by collecting samples from the same portions of the bottle neck 2 as in the measurements of density, setting each sample in a sample pan, and heating the sample from 20° C. to 300° C. at a constant speed (10° C./min). $\Delta Hc$ was obtained from an area of the exothermic peak that developed during the crystallization in the temperature range of about 80 to 180° C. $\Delta Hm$ was obtained from an area of the endothermic peak that developed during the melting in the temperature range of about 170 to 260° C.

(3) Rates of dimensional changes were obtained as follows: Heat tests were conducted by filling bottles with hot water at a temperature of 90° C. in a supposed hot filling operation. Rates of changes in outer diameters before and after the hot filling were measured at positions of the lip portion 2a, the screw threaded portion 2b, the portion under the bead 2d, and the neck ring portion 2e, respectively, of the bottle neck 2. Average rates of dimensional changes were then calculated. Here it is appropriate considering that the rate of dimensional change is less than 0.25%, or more preferably 0.2% or less, in order for the neck to have secure sealability.

Figure 4:
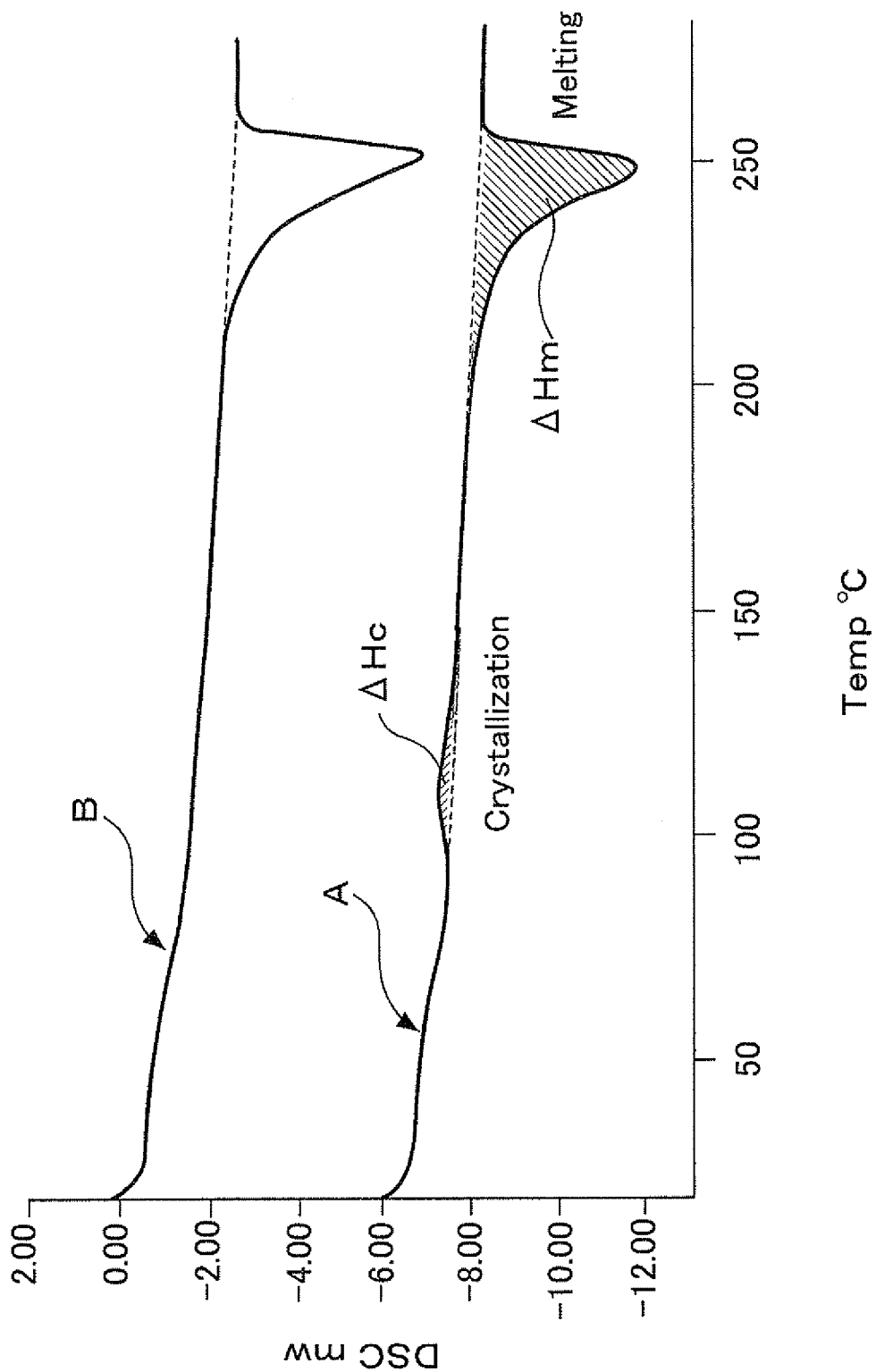
FIG. 4 is a graph showing examples of DSC measurements.

FIG. 4 is a graph showing examples of DSC measurements, in which line A is the results of measurements using the samples collected from the bottle neck 2 that has been molded at a mold temperature of 118.5° C., as shown in Table 1 of FIG. 3; and line B is the counterparts using the samples collected from the bottle neck 2 that has been molded at a mold temperature of 149° C. Taking a look at measurements for samples A, it is found that with a constant heating speed (10° C./min) starting from 20° C., the crystallization begins to develop near 80° C., and the peak comes to an end at near 150° C. If the rise in temperature continues, the melting of crystals begins to proceed at around 190° C., and the peak comes to an end at near 260° C. The crystallization enthalpy $\Delta Hc$ and the melting enthalpy $\Delta Hm$ can be calculated from the illustrated areas of the peaks (the hatched areas in the figure).

The measurements for samples B show that no exothermic peak developed in the samples obtained from a mold temperature of 149° C. because crystallization has already been in full progress. The crystallization enthalpy $\Delta Hc$ is based on the exothermic peak, and is usually described in minus values. However, in this invention, its absolute value, $|\Delta Hc|$, is used to obtain an index to the progress of crystallization. At the mold temperatures of 135 and 149° C., no exothermic peak developed under the DSC measuring conditions used in these tests. In those cases, Table 1 gives results of zero. Because of these results, DSC measurement was omitted for the samples obtained at the mold temperature of 167° C.

Table 1 of FIG. 3 shows the following findings:

(1) With an increase in the mold temperature in a range of 110° C. to 167° C., the density becomes larger, and the rate of dimensional change in the bottle neck becomes smaller.

(2) With the increase in the mold temperature in a range of 110° C. to 149° C., $|\Delta Hc|$ and the rate of dimensional change in the bottle neck become smaller.

(3) As a standard for heat-resisting property, the rate of dimensional change in the outer diameter of the bottle neck 2 must be less than 0.25% from a point of view of the maintenance of scalability by the cap. With this standard, there come the following standards for the heat-resisting bottle neck: A density level of 1.368 cm$^3$ or more and a ratio of $|\Delta Hc|/\Delta Hm$ less than 0.1.

(4) If the total stretching ratio for the bottle neck 2 is about 4 times as in the case of this embodiment, the above standards can be achieved by setting the mold temperature at 135° C. or higher.

The constituent features and action-and-effects of this invention have been described with respect to preferred embodiments. However, it is to be understood that the preferred embodiments of this invention should not be construed as limitative to the above-described embodiments. For example, these embodiments were described for a round bottle with a capacity of 725 ml, but this invention is also applicable to square or rectangular bottles, and to the bottle of smaller or larger sizes. A PET resin bottle was described in the above embodiments, but as described above, this invention is also applicable to the bottles of PET series resins copolymerized or blended with other ingredients, so long as there is no damage to the essential quality of the PET resin. The cutoff portion C shown in FIG. 2 may have other shapes arbitrarily selected by giving consideration to the preform productivity or equipment and productivity associated with the cutoff operation.

INDUSTRIAL APPLICABILITY

As described above, the biaxially stretched, blow-molded bottles of this invention made of a PET series resin can be provided with a wide-mouthed, heat-resisting neck, while controlling an increased material cost and decreased productivity. Because of beneficial features, the bottle of this invention is expected to have wide applications of use in the field where hot filling is required.

DESCRIPTION OF REFERENCE SIGNS

1. Bottle
2. Bottle neck
2a. Lip portion
2b. Screw threaded portion
2c. Bead portion
2d. Portion under the bead
2e. Neck ring
3. Shoulder
4. Body
5. Bottom
6. Peripheral groove rib
11. Intermediate molded product
13. Stretched connection
14. Peripheral guide groove
21. Preform
22. Preform neck 22b. Screw thread
22e. Preform neck ring
24. Body
25. Bottom
C. Cutoff portion

The invention claimed is:

1. A bottle made of a resin comprising at least one of polyethylene terephthalate and a copolymerized polyester comprising ethylene terephthalate, the bottle being molded by a biaxial stretching and blow molding process, and the bottle comprising:
   a bottle body; and
   a bottle neck formed, just as the bottle body is formed, by expanding a body of a preform in a shape of a test tube in a stretching step of the molding process,
   wherein the bottle neck has an average thickness in a range of 1.0 to 1.8 mm,
   wherein the bottle neck has a total draw ratio (product of a vertical draw ratio and a lateral draw ratio) of about 4 times,
   wherein the bottle neck is formed in a portion of a mold that is set at a temperature within a thermally crystallizable range of the resin,
   wherein a ratio of an absolute value of crystallization enthalpy, $\Delta Hc$, to melting enthalpy, $\Delta Hm$ ($|\Delta Hc|/\Delta Hm$) of the bottle neck is a value less than 0.1,
   the crystallization enthalpy $\Delta Hc$ being calculated from an exothermic peak appearing at the time of crystallization of a sample of the bottle neck; and the melting enthalpy $\Delta Hm$ being calculated from an endothermic peak appearing at the time of melting of the sample of the bottle neck, as observed by differential scanning calorimetry (DSC) measured at temperatures rising at a constant speed, and
   wherein a rate of dimensional change in the outer diameter of the bottle neck is kept at 0.2% or less, as calculated in heat tests conducted by filling the bottle with hot water having a temperature of 90° C.

2. The bottle according to claim 1, wherein the average thickness of the bottle neck is in a range of 1.05 to 1.8 mm.

3. The bottle according to claim 1, wherein the bottle neck is a wide-mouth bottle neck.

4. A biaxially stretching and blow molding process for manufacturing a bottle made of a resin comprising at least one of polyethylene terephthalate and a copolymerized polyester comprising ethylene terephthalate, the process comprising the steps of:
   (1) using a preform in a shape of a test tube;
   (2) setting a predetermined mold temperature within a thermally crystallizable range used for the resin to heat an area of a blow mold where a bottle neck is formed;
   (3) forming the bottle neck, in a manner similar to forming a body of the bottle, by expanding a diameter of the preheated preform in the test tube shape during a stretching step of a biaxial stretching and blow molding process so that the bottle neck has an average thickness in a range of 1.0 to 1.8 mm and has a total draw ratio (product of a vertical draw ratio and a lateral draw ratio) of about 4 times; and
   (4) adjusting the set values of the draw ratio and the mold temperature associated with the bottle neck so that a ratio of an absolute value of crystallization enthalpy, $\Delta Hc$, to melting enthalpy, $\Delta Hm$, ($|\Delta Hc|/\Delta Hm$) of the bottle neck is a value less than 0.1, where the $|\Delta Hc|/\Delta Hm$ is an index of the extent to which crystallization is in progress at the bottle neck,
   wherein the crystallization enthalpy $\Delta Hc$ is calculated from an exothermic peak appearing at the time of crystallization of a sample of the bottle neck; and the melting enthalpy $\Delta Hm$ is calculated from an endothermic peak appearing at the time of melting of the sample of the bottle neck, as observed by differential scanning calorimetry (DSC) measured at temperatures rising at a constant speed, and
   wherein a rate of dimensional change in the outer diameter of the bottle neck is kept at 0.2% or less, as calculated in heat tests conducted by filling the bottle with hot water having a temperature of 90° C.

5. The process for manufacturing the bottle according to claim 4, wherein a portion of the mold in which to mold the bottle neck is heated to a temperature of 135° C. or higher.

6. The process for manufacturing the bottle according to claim 4, wherein the preform in the test tube shape is stretched by the biaxial stretching and blow molding to form the bottle neck and to obtain a final molded product in a process comprising the steps of:
   (1) using the preform having a cylindrical body and having a preform neck, with a preform neck ring disposed at an upper end of the body of the preform;
   (2) placing the preform in a mold by utilizing the preform neck;
   (3) biaxially stretching the body and a bottom of the preform to form the neck, a shoulder, the body, and a bottom of the bottle; and
   (4) then cutting off a portion of the preform including the preform neck, which has been integrally connected to an upper end of the bottle neck.

7. The process for manufacturing the bottle according to claim 5, wherein the preform in the test tube shape is stretched by the biaxial stretching and blow molding to form the bottle neck and to obtain a final molded product in a process comprising the steps of:
   (1) using the preform having a cylindrical body and having a preform neck, with a preform neck ring disposed at an upper end of the body of the preform;
   (2) placing the preform in a mold by utilizing the preform neck;
   (3) biaxially stretching the body and a bottom of the preform to form the neck, a shoulder, the body, and a bottom of the bottle; and
   (4) then cutting off a portion of the preform including the preform neck, which has been integrally connected to an upper end of the bottle neck.

8. The process according to claim 4, wherein the bottle neck is formed so that the average thickness of the bottle neck is in a range of 1.05 to 1.8 mm.

9. The process according to claim 4, wherein the bottle neck is a wide-mouth bottle neck.

* * * * *

UNITED STATES PATENT AND TRADEMARK OFFICE
CERTIFICATE OF CORRECTION

PATENT NO. : 8,980,390 B2
APPLICATION NO. : 13/388190
DATED : March 17, 2015
INVENTOR(S) : Yoshihiro Fuse et al.

It is certified that error appears in the above-identified patent and that said Letters Patent is hereby corrected as shown below:

In the Specification

Column 4, line 48, to correct ratioxlateral to ratio_x_lateral

Column 8, line 14, to correct scalability to sealability

In the Claims

Column 9, line 26, Claim 1, to correct $(|\Delta Hcl/\Delta Hm)$ to $(|\Delta Hc|/\Delta Hm)$ Column 10, lines 4 and 5, Claim 4, to correct $(|\Delta Hcl/\Delta Hm)$ to $(|\Delta Hc|/\Delta Hm)$ Signed and Sealed this
Eighth Day of September, 2015

Michelle K. Lee
*Director of the United States Patent and Trademark Office*